F. L. CONNABLE.
COLLAR PIN.
APPLICATION FILED FEB. 10, 1913.
1,091,913.
Patented Mar. 31, 1914.
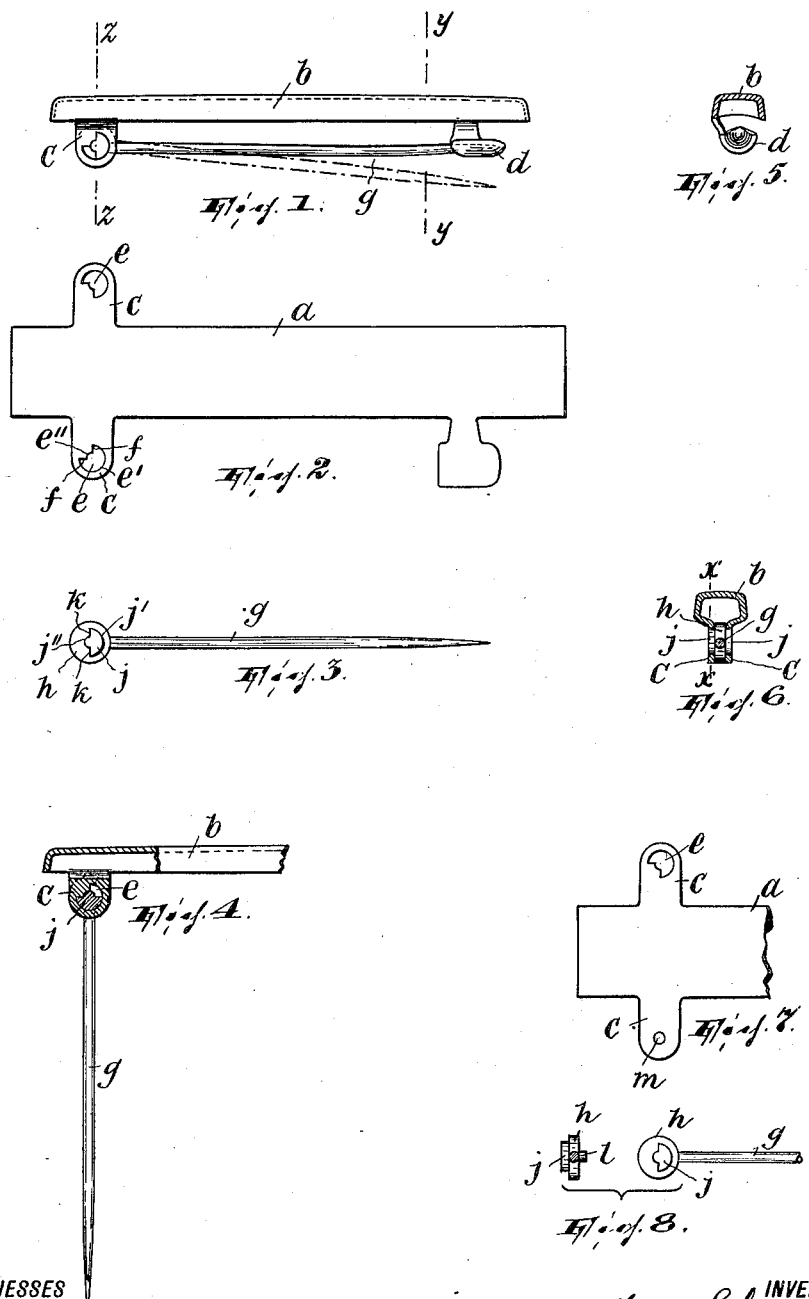
WITNESSES
INVENTOR,
Frank L. Connable,
BY
ATTORNEY.

UNITED STATES PATENT OFFICE.

FRANK L. CONNABLE, OF WILMINGTON, DELAWARE.

COLLAR-PIN.

1,091,913.  Specification of Letters Patent.  Patented Mar. 31, 1914.

Application filed February 10, 1913. Serial No. 747,245.

*To all whom it may concern:*

Be it known that I, FRANK L. CONNABLE, a citizen of the United States, residing at Wilmington, in the county of Newcastle and State of Delaware, have invented certain new and useful Improvements in Collar-Pins, of which the following is a specification.

The present invention consists in certain improvements in pins of the safety or sheath type whereby the cost of manufacture thereof may be very materially reduced and a stronger and generally better pin than those now used may be produced.

According to this invention the pin member is pivoted to the body member by a joint including a bearing opening in one member and a mutilated trunnion on the other, said opening having an inwardly projecting stop limiting the pivotal movement of the trunnion. In the preferred construction, the said joint is formed by providing the body member with a pair of apertured ears and forming the pin member with a flat head having lateral trunnions, which head stands clasped between the ears with its trunnions received in the bearings formed by the apertures or openings thereof, and said openings and trunnions having opposed pairs of co-acting concentric arcuate bearing surfaces, those of one pair having a greater radius than those of the other, whereby stops are produced for limiting the pivotal movement of the pin member.

Referring, now, to the accompanying drawing, Figure 1 is a side elevation of the pin, the pin member thereof being in the closed position; Fig. 2 is a plan of the blank from which the body member is formed; Fig. 3 is a side elevation of said pin member; Fig. 4 is a fragmentary side elevation, partly in section on line $x$—$x$ of Fig. 6, showing the pin member in the opened position; Figs. 5 and 6 are sectional views on lines $y$—$y$ and $z$—$z$, of Fig. 1, looking respectively toward the right and left in said figure; and, Figs. 7 and 8 are views of a modification, Fig. 7 being a fragmentary view of the blank of the body member and Fig. 8 showing the head of the pin member in side and front elevation.

From the blank $a$ shown in Fig. 2 is formed (as by a drawing operation) the body member $b$ having the depending pair of suitably spaced ears $c$ and the underhanging sheath $d$ for the point of the pin member. It will be understood that the main or body portion of the body member may have any desired form.

Referring, now, to the first six figures of the drawing each ear has a bearing opening $e$ formed therein, the same including concentric arcuate bearing surfaces $e'$ and $e''$ relatively opposed to each other and the surface $e'$ being of greater extent and having greater radius than the surface $e''$. The ends of these surfaces are joined by the surfaces $f$ each arranged (in the present instance) in a radius concentric with said surfaces $e'$ and $e''$, thus forming stops or abutments.

The pin member includes the shank $g$ and the flat disk-shaped head $h$, from which project in opposite directions the mutilated trunnions $j$ formed in the present instance with the concentric arcuate bearing surfaces $j'$ and $j''$ relatively opposed to each other and the former extending through less degrees of a circle than the bearing surfaces $e'$ above referred to; the arcuate surface $j'$ has a greater radius than the arcuate surface $j''$. The ends of these surfaces are joined by the surfaces $k$ each arranged (in the present instance) in a radius concentric with surfaces $j'$ and $j''$. The pin member, including its head and trunnions, is swaged up from one piece of stock. The radii of the surfaces $e'$ and $j'$, and those of the surfaces $e''$ and $j''$, are equal, or substantially so. In the present instance, the surface $e'$ extends through 270°, and the surface $j'$ through 180°, of a circle. Thus, when the parts are assembled, i. e., by introducing the head of the pin member between the ears of the body member and then pressing the latter together, at the same time causing their bearing openings to receive the trunnions, a joint will be formed permitting the pin member to swing on the axis of the several surface $e'$, $e''$, $j'$ and $j''$ to limits afforded by stops $f$ and $k$, that is (in the present instance), from the position of the pin member shown in Fig. 4 to the dotted line position thereof shown in Fig. 1. The strength and durability of the improved construction, especially with respect to the stops which positively prevent the pin member from swinging open past the predetermined limit, or closed to such an extent that the pin, on being sprung into the sheath, will not be under the tension required to assuredly preserve it there, will be obvious.

The new construction is obviously simple and inexpensive, requiring as it does only two pieces, each produced by simple operations.

On reference to Fig. 6 it will be seen that the ears c have their inner flat surfaces bearing squarely against the side faces of the head of the pin member. The parts thus have at the joint broad contact with each other and, further, the ears being given an increased stiffness due to bending them inwardly as shown in said figure, the pin member is held positively against any but pivotal motion in a single plane.

According to the construction shown in Figs. 7 and 8 the joint on the one hand is formed as above described and on the other by a single pintle l received by the plain bearing opening m.

Having thus fully described my invention, what I claim as new and desire to secure by Letters Patent is:—

1. In a safety pin or the like, a body member and a pin member pivotally jointed together, the joint-forming portion of one member snugly fitting the joint forming portion of the other and being a bearing opening having arcuate bearing surfaces of different radii concentric with the axis of pivotal movement of the pin member and the joint-forming portion of the other member being a trunnion journaled in said opening and having arcuate bearing surfaces also concentric with said axis and respectively contacting with the bearing surfaces of the first-named member, substantially as described.

2. In a safety pin or the like, a body member and a pin member pivotally jointed together, the joint-forming portion of one member snugly fitting the joint-forming portion of the other and being a bearing opening having arcuate bearing surfaces of different radii concentric with the axis of pivotal movement of the pin member and stops joining said surfaces and the joint-forming portion of the other member being a trunnion journaled in said opening and having arcuate bearing surfaces also concentric with said axis and respectively contacting with the bearing surfaces of the first-named member and also having stops respectively engageable with the first-named stops, substantially as described.

3. In a safety pin or the like, a body member and a pin member pivotally jointed together, the joint forming portion of said members snugly fitting each other and including an ear on the body member and a head on the pin member held face to face against each other and one having an opening and the other a trunnion having opposite bearing surfaces of different radii concentric with the axis of pivotal movement of the pin-member and each approximating a semi-circle and said opening having arcuate bearing surfaces also concentric with said axis and having in contact therewith the bearing surfaces, respectively, of said trunnion, substantially as described.

In testimony whereof I affix my signature in presence of two witnesses.

FRANK L. CONNABLE.

Witnesses:
Wм. Mason Allen,
T. W. Keithley.

---

Copies of this patent may be obtained for five cents each, by addressing the "Commissioner of Patents, Washington, D. C."